United States Patent
Desai (10) Patent No.: US 11,596,873 B2
(45) Date of Patent: Mar. 7, 2023

(54) SYSTEM FOR SIMULTANEOUS RECOVERY OF PURIFIED WATER AND DISSOLVED SOLIDS FROM IMPURE HIGH TDS WATER

(71) Applicant: ETHICAL ENERGY PETROCHEM STRATEGIES PVT. LTD, Ahmedabad (IN)

(72) Inventor: Dhiren M Desai, Ahmedabad (IN)

(73) Assignee: ETHICAL ENERGY PETROCHEM STRATEGIES PVT. LTD, Ahmedabad (IN)

(*) Notice: Subject to any disclaimer, the term of this patent is extended or adjusted under 35 U.S.C. 154(b) by 18 days.

(21) Appl. No.: 17/287,069

(22) PCT Filed: Apr. 18, 2019

(86) PCT No.: PCT/IN2019/050315
§ 371 (c)(1),
(2) Date: Apr. 20, 2021

(87) PCT Pub. No.: WO2020/084630
PCT Pub. Date: Apr. 30, 2020

(65) Prior Publication Data
US 2021/0387108 A1    Dec. 16, 2021

(30) Foreign Application Priority Data
Oct. 22, 2018  (IN) .............................. 201821039830

(51) Int. Cl.
*B01D 3/06*    (2006.01)
*B01D 3/00*    (2006.01)
(Continued)

(52) U.S. Cl.
CPC .............. *B01D 3/06* (2013.01); *B01D 3/007* (2013.01); *B01D 3/42* (2013.01); *B01D 21/2461* (2013.01);
(Continued)

(58) Field of Classification Search
CPC .... C02F 1/008; C02F 1/06; C02F 1/38; C02F 2209/02; C02F 2303/10; B01D 3/06;
(Continued)

(56) References Cited

U.S. PATENT DOCUMENTS 3,926,739 A     12/1975  Izumi ........................... 202/173
6,375,803 B1 *  4/2002   Razzaghi ............. B01D 1/2856
                                                    159/901

(Continued)

FOREIGN PATENT DOCUMENTS

CN    104707349 B    1/2017
IT      1281057 B1   2/1998

OTHER PUBLICATIONS

International Search Report dated Jul. 31, 2019, issued to International Application No. PCT/IN2019/050315.

*Primary Examiner* — Jonathan Miller
(74) *Attorney, Agent, or Firm* — Stein IP, LLC (57) ABSTRACT

The present system is for simultaneous recovery of purified water and dissolved solids from impure high TDS water (1) which is achieved in a single step and eliminates the use of external thermal energy for making the system significantly efficient. It eliminates the use of boiler, cooling tower that reduces the overall capital cost and continuous requirement of external thermal energy for making system efficient. The simultaneous recovery of the purified water and solids from high TDS input effluent reduce the energy intensity of the system. Said system provides a vacuum system as heat pump which enables the system to be self-sufficient in thermal energy requirements for evaporation process and reduces GHG emissions significantly.

4 Claims, 2 Drawing Sheets

(51) Int. Cl.
  *B01D 3/42* (2006.01)
  *B01D 21/24* (2006.01)
  *B01D 21/26* (2006.01)
  *C02F 1/00* (2023.01)
  *C02F 1/06* (2023.01)
  *C02F 1/38* (2023.01)

(52) U.S. Cl.
  CPC ............ *B01D 21/262* (2013.01); *C02F 1/008* (2013.01); *C02F 1/06* (2013.01); *C02F 1/38* (2013.01); *C02F 2209/02* (2013.01); *C02F 2303/10* (2013.01)

(58) Field of Classification Search
  CPC ...... B01D 3/007; B01D 3/42; B01D 21/2461; B01D 21/262
  See application file for complete search history.

(56) References Cited

U.S. PATENT DOCUMENTS

| | | | |
|---|---|---|---|
| 6,551,466 B1* | 4/2003 | Kresnyak | B01D 1/2856 |
| | | | 159/901 |
| 7,681,643 B2* | 3/2010 | Heins | E21B 43/24 |
| | | | 159/901 |
| 7,837,768 B2* | 11/2010 | Sanderson | B01D 19/0005 |
| | | | 210/103 |
| 9,604,864 B2* | 3/2017 | Berros | F22B 3/04 |
| 10,202,286 B2* | 2/2019 | Ertel | B01D 9/0036 |
| 10,357,726 B2* | 7/2019 | Qin | F22B 1/16 |
| 10,414,670 B2* | 9/2019 | Becker | B01D 1/0035 |
| 10,836,651 B2* | 11/2020 | Dussault | B01D 5/0039 |
| 2013/0075245 A1 | 3/2013 | Frick | 203/22 |

\* cited by examiner

SYSTEM FOR SIMULTANEOUS RECOVERY OF PURIFIED WATER AND DISSOLVED SOLIDS FROM IMPURE HIGH TDS WATER

CROSS-REFERENCE TO RELATED APPLICATIONS

This application is a national stage of International Application No. PCT/IN2019/050315, filed Apr. 18, 2019, which claims the benefit of Indian Application No. 201821039830, filed Oct. 22, 2018, in the Indian Patent Office, the disclosures of which are incorporated herein by reference.

FIELD OF INVENTION

The present invention relates to system for simultaneous recovery of purified water and dissolved solids from impure high TDS water. More particularly, the present invention relates to system for simultaneous recovery of purified water and dissolved solids from impure high TDS water which is achieved in a single step (implying single stage operation for recovery of purified water and dissolved solids instead of multistage operation required in prior arts) and without using any external thermal energy thereby making the system significantly efficient.

BACKGROUND OF THE INVENTION AND THE PRIOR ART

Water is a scarce resource for which lot of attention is drawn by various agencies in the world. Water is consumed by various industries in great amount. The industrial manufacturing activities generally result in the production of due to use of fresh water in manufacturing activity. The effluent is Liquid waste with high TDS flowing out of a factory, farm, commercial establishment, or a household into a water body such as oceans, river, lake, or lagoon, or sewer system or reservoir. Effluent management and disposal are big tasks for all industries.

TDS (Total Dissolved Solids) is an indicator of the hardness of water. The high TDS water contains dissolved solids in concentration beyond desirable limits whereby have major issues when consumed and resulting in medical problems like kidney problems, indigestion, gastric problems, constipation, blood thickening, eye problems, high blood pressure, fatigue etc. and also effects on our skin. World Health Organization (WHO) or similar agencies have published maximum limits of TDS content for water used for human consumption and/or for disposal into various types of water bodies. Therefore there is a need of purifying high TDS water for reducing dissolved solids present in the water to a level which is acceptable for human consumption or for disposal into a water body.

Further, effluent generated by various types of industries results in a lot of harm to the environment by contaminating water bodies and world over stringent regulations are being put in place to reduce environmental impact arising out of disposal of effluent/wastewater from various types of industrial activities. World over various regulating bodies of the Governments have been specifying standards for quality of effluents that can be disposed. In many cases the regulatory agencies have been insisting on achieving zero discharge (especially for industries having very high water demand). Hence effluent has to be either treated well before disposal or processed to recover water (to achieve zero discharge) which adds on substantial cost to the general manufacturing related costs. High cost of water recovery, due to high energy requirements, for achieving zero discharge is one of the most worrying factors for water intensive industries.

Apart from industrial effluents, high TDS content of many water resources also need treatment before its use. There have been various efforts for recovery of purified water from such high TDS water and separation of dissolved solids from said impure high TDS water.

Further, the conventional system for purification of TDS water requires the technical experts (man power) for operating and/or monitoring the multistage process for water purification system. Involvement of the technical experts for the purpose mentioned herein; there are chances of human errors in the operating and/or monitoring process.

Hence, it may result into inconsistency in process steps within the system further resulting in reduced efficiency of the system. Further, in cases of such errors, additional time is required for the fixing the errors, which in turn results in energy consumption.

Stakeholders, globally, are in need of water purification system hence requisite of recover, recycle, conserve and reuse of water for sustainability of economic development.

Earlier efforts for achieving zero discharge included use of recovery systems such as:

1. Zero Discharge System (ZLD):

Zero Discharge systems involve recovery of pure water from high TDS water. This conventional Zero Discharge system is a series of processing arrangements. The common examples of such system include Reverse Osmosis (RO), Mechanical vapour recompression (MVR), Multiple effect evaporators (MEE) and finally Agitated thin film drier (ATFD) type of driers to separate solids from waste water. The limitations of these systems are as follows:

a) RO System:

RO systems can recover only 50-70% of water in effluent depending upon the inlet effluent's solid concentration. The known RO systems for industrial effluents have been able to achieve solids concentration in reject water in the range of 5-10% only. Hence substantial amount of water present in feed effluent is lost with reject water. Moreover dissolved solids present in the input effluent cannot be recovered as solids in any RO system. Therefore the RO systems have the process of separation of water and solid involves multiple steps which making it energy consuming.

b) MVR Systems:

MVR systems can remove limited water from RO effluent so as to give concentrated water stream with about 10-15% solids content. The MVR systems typically use fan type of vapour compression to increase the pressure of water vapour generated by evaporation. Due to this the temperature at which the compressed steam from MVR can condense is increased by at the most 10-15° C. Moreover, when the solids concentration of water is increased by the evaporation, the boiling point of concentrated solution increases compared to that of pure water at the same pressure. This increase in boiling point of concentrated solution with limited increase in steam condensation temperature limits the solids concentration that can be achieved by MVR in the reject water. Hence the MVR system has limited ability to achieve temperature difference by vapour compression and said system is not able to separate dissolved solids in feed as solids and is able to only achieve increase in solids concentration in reject water.

c) MEE System:

The MEE system use steam to evaporate water and cannot achieve complete water recovery from concentrated water stream and such systems give water with about 40-50% solids content. The MEE systems have multiple stages for the evaporation wherein external steam supply is given in one stage and steam generated from that stage is then used in subsequent stage by lowering the operating pressure of the subsequent stage. Further, this sequence is repeated depending upon the number of stages used in MEE. In case of MEE system typically shell and tube type exchanger configurations are used and the feed water is concentrated in its solids content in each stage. Subsequently the dissolved solids have limits on their solubility in water, hence the solids start precipitating in exchanger tubes as the concentration increases. This is the main reasons for tube choking problems in operation of systems resulting in frequent stoppages, cleaning and maintenance issues. Due to this characteristic of MEE system operation, it is not possible to evaporate all the water present in the feed as the concentrated water after each stage has to be pumpable. Thus, known MEE systems also cannot recover all the dissolved solids as solids and the concentrated water produced from such systems is normally slurry of some solids and balance saturated water with dissolved solids. Hence; the MEE system includes the multiple stages for the purification process of TDS water which makes the process energy intensive. The system requires technical experts for monitoring the multiple stages which increases the risk of errors which result into inconsistency in process steps within the system and further resulting in reduced efficiency of the system.

d) Agitated Thin Film Drier (ATFD) Type Solids Drier:

The ATFD type solid drier are used after the MEE system for solid separation. Further, the concentrated water stream from MEE is normally fully evaporated in ATFD type solids driers which need medium pressure steam as heating medium for complete evaporation of the remaining water from the solids present in input slurry from MEE system. Further from the said ATFD type of driers the solids are recovered as a separate product from the systems. Hence said process of separation of the water and solids from high TDS water involves multiple steps making it cumbersome, infrastructure and energy intensive. Further, using the additional equipment for drying process makes the system costly. The system require technical experts for the monitoring the multiple stages which increases the risk of errors which result into inconsistency in process steps within the system and further resulting in reduced efficiency of the system.

e) Vacudest System:

Vacudest vacuum distillation systems is a modified version of combining MVR and MEE type operations so as to achieve impurities concentration in reject water. The system involves the shell and tube type of heat exchanger wherein evaporation and boiling occurs in the exchanger which could potentially lead to tube choking and maintenance issues similar to those faced in MEE systems. Said system does not include any separation of dissolved solids in feed as solids and indicates need for a reject water stream to remove the impurities present in the input water. Further, the company literature specifies types of industrial effluents that their system can process and those skilled in the art can make out that the system is not designed to handle effluents mainly with objective of removing dissolved solids from input water but to remove other impurities (along with small solids content) generated in specified types of industries. Hence; said system does not separate out dissolved solid from the effluent and have the possibility of tube chocking, and maintenance issues.

2. Steam Generation for Use in ZLD Systems:

Conventionally all the ZLD systems with above processing steps have requirement of steam for evaporating water from the high TDS input water. Fossil fuel fired boilers are required for this purpose. Further, MEE systems need cooling water for condensation of evaporated water. Thus, support utility system in the form of cooling tower is also required. Hence; using further additional equipment for drying process makes the system costly.

In order to avoid the use of fossil fuels (and thereby avoid emission of greenhouse gases (GHG)), possibility of generating steam from water by using the concept of heat pump has been explored and tried by some.

Further; the Heat pumps are used to upgrade low temperature heat energy to high temperature, usable form of heat energy. Technically heat pumps are reverse of refrigeration cycles. The heat pump available in the market, using ambient heat as the heat source, gives hot water in the temperature range of 80-90° C. maximum due to technical limitations and steam generation from ambient heat is not achieved in any of the known systems.

The heat pump system used in the one of the technique i.e. "STEAM GLOW", system which is developed by a Kobe steel, to generate steam from waste heat source in the temperature range upto 65-70° C. These systems involve very high pressure and temperature-based compression cycle for it to act as heat pump. Since it uses R245 and R134 as heat pump fluid in closed loop cycle Steam Glow are quite expensive. Further, the energy efficiency measure, COP, claimed in such systems is 3.2 for steam generated at 200 kPaA and COP is 2.5 if steam is generated at 700 kPaA.

Amongst other efforts known for use of heat pump for ZLD type system are MVR systems and Vacudest System which have different temperature differential between the boiling liquid and condensing steam with Vacudest reporting the highest such temperature differential. Vacudest system uses a single stage compression. The temperature of water under evaporation is about 85° C. and the steam generation temperature claimed is 120° C. Thus, maximum temperature differential possible in Vacudest system is about 35° C. However, the system would invariably need start up steam or some other heat source to achieve the temperature of 85° C. required for starting evaporation in vessel.

PRIOR ARTS

Various water purification system and recovery of dissolved solids from impure high TDS water have been applied for patents are disclosed in different patent documents:

United States Patent 20130075245 discloses water purification system includes a high temperature water tank, a flameless heat source, a cylindrical vessel (hydrocyclone nest), a first pump, a steam production meter, and a steam condenser and heat exchanger. The contaminated water is heated within the high temperature water tank using the flameless heat source. However, the invention needs external heat source for steam generation which limits the application of the system to industries which have such high temperature waste heat source. Further using additional equipment for drying process makes the system costly and also energy consuming. And there is absence of separation of dissolved solids as solids from impure water.

Chinese patent CN104707349B discloses a plate type evaporator MVR heat pump evaporator, the system comprises a feed preheat line, a circulation line was evaporated, the compression pipe, condensate lines, water pipes, and the discharge drain line. With steam as recycling purposes and to save energy, the system is designed, the compressor can be effectively protected and automate control and regulation of the system. The evaporation system is mainly used for evaporation, the solution was evaporated salt industrial salt, industrial wastewater environmental concentrated aqueous solution of the chemical industry and other relatively clean liquid for efficient evaporative concentration, relative evaporation traditionally, and it has a clear advantage and saving huge economic benefits. However, the invention involves compression of the steam using a screw compressor which is less efficient due to the type of compression system and needs electrically heated heat transfer fluid system (HTF) for system start-up therefore using the other utilities for the steam generation which make the system expensive. Further Plate type evaporator has been used wherein the evaporation take place in heat exchanger which has potential for choking (as is commonly known for MEE type systems) of heat exchanger which leads to incidental operations and maintenance issues. There is no disclosure on separation of dissolved solids as solids in this patent.

Italy Patent IT1281057B1 discloses the water to be purified is sent into an evaporator, causing heating thereof and at least partial transformation into steam with consequent concentration of the liquid phase. The steam is then compressed and sent to a heat exchanger so as to give up its latent heat to the incoming water, with consequent condensation of the steam. However, the invention uses the additional utilities like boiler for steam generation for startup which increases the cost of the system. Further, there is no disclosure of dissolved solids separation as solids in the process.

United States Patent U.S. Pat. No. 3,926,739 discloses desalting plant of multiple effect evaporator and multistage flash evaporators, saline water including calcium sulfate is fed to a first flash evaporator after being preheated through the multiple flash evaporators to a temperature slightly below the critical precipitation temperature of hemihydrite, about 150° C., and in the first evaporator, the saline water is evaporated to produce brine and vapor. However, there is need for external thermal energy and cooling water for operations which implies need for additional utilities thereby increasing the cost of the system and it is energy intensive. Using additional equipment for drying process makes the system costly. Further there is no disclosure of separation of dissolved solids as solids.

DISADVANTAGES OF THE PRIOR ART

None of the existing prior art provides the system for recovery of purified water and dissolved solids from high TDS input water in a single step.

None of the existing prior art provided complete water evaporation without any external thermal energy input.

Most of them need the technical experts (man power) for operating and/or monitoring the multiple stages for water purification system which result into inconsistency in process steps within the system and reduced efficiency of the system.

Most of them require support utilities like boiler and cooling tower; which add on cost and continuous requirement of external thermal energy making system inefficient and expensive.

Many of them involve the use of shell & tube type heat exchangers, which gets choked frequently and makes the system cumbersome to operate and highly maintenance prone.

Though none of the existing systems use high temperature heat pumps for steam generation, the only such heat pump available operates at very high pressure making it very expensive and it needs external waste heat source and its energy efficiency is not very high.

Most of them have very high footprint since it involves many process systems needing large land area and civil works costs.

None of them offer a cost effective system which can also be installed at large as well as small and medium sized industries and providing versatility for varied scale applications to help in achieving sustainable development of economies.

None of them provides ease and reliability in continuous operation of the system.

None of them provides simple, user friendly yet efficient system.

Therefore, there is utmost need to come up with an invention that obviates the above mentioned disadvantages of the prior art.

OBJECTS OF THE INVENTION

The main object of the invention is to provide a system for simultaneous recovery (implies single stage operation) of purified water and dissolved solids from high TDS input water.

Another object of the invention is to provide a system for simultaneous recovery of purified water and dissolved solids from impure high TDS water which reduce the energy consumption.

Yet another object of the invention is to provide a system for simultaneous recovery of purified water and dissolved solids from impure high TDS water in which water evaporation is achieved without any external thermal energy input making it significantly efficient and resulting in reduction of GHG emissions.

Yet another object of the invention is to provide a system for simultaneous recovery of purified water and dissolved solids from impure high TDS in which support utilities like boiler and cooling tower are not required which reduces the overall capital cost and, also, cost of continuous requirement of external thermal energy thereby making system efficient.

Yet another object of the invention is to provide a system for simultaneous recovery of purified water and dissolved solids from impure high TDS water in which heat supplied, through heat pump, is used for sensible heating of water and evaporation of water takes place in flash vessel thereby obviating problem of choking of heat exchanger tubes and provides ease and reliability in continuous operation of the system.

Yet another object of the invention is to provide a system for simultaneous recovery of purified water and dissolved solids from impure high TDS water requiring very low electrical energy and no thermal energy to operate the system thereby making the system self-sufficient.

Yet another object of the invention is to provide a system for simultaneous recovery of purified water and dissolved solids from impure high TDS water which can be made completely automated system with possibilities for remotely controlled operations.

Yet another object of the invention is to provide a system for simultaneous recovery of purified water and dissolved solids from impure high TDS water which operate under vacuum and heat pump needs compression to pressure only slightly higher than atmospheric pressure making it efficient and cost effective.

Yet another object of the invention is to provide a system for simultaneous recovery of purified water and dissolved solids from impure high TDS water which is compact, preassembled and may be containerized to operate as "plug and play" system resulting in less requirement of land and civil works costs.

Yet another object of the invention is to provide a system for simultaneous recovery of purified water and dissolved solids from impure high TDS water with very low footprint since it involves a single stage process and, therefore, need small land area and reduce civil works costs.

Another object of the invention is to provide a system; for simultaneous recovery of purified water and dissolved solids from impure high TDS water; which is simple, user friendly and yet efficient.

Yet another object of the invention is to provide a system for simultaneous recovery of purified water and dissolved solids from impure high TDS water which provides a significantly efficient and cost effective system that can be installed at large as well as small and medium sized industries and providing versatility for varied scale applications to help in achieving sustainable development of economies.

MEANING OF REFERENCE NUMERALS OF SAID COMPONENT PARTS OF PRESENT INVENTION

1: System for simultaneous recovery of purified water and dissolved solids from impure high TDS water
2: Effluent input feeder
3: Vacuum cum heat pump
3A: Water injection
3B: Compression units
3C: Preheating system
P: Plurality of Passage
4: Plurality of Heat exchanger
4A: First Heat exchanger
4B: Second Heat exchanger
5: Flash vessel
6: Plurality of pumps
6A: P3 Pump
6B: P7 Pump
7: Centrifugal separator
8: Screw feeder Induction type heating system

BRIEF DESCRIPTION OF THE INVENTION

The embodiment of the present invention is to provide a system for simultaneous recovery of purified water and dissolved solids from impure high TDS water (1) which is achieved in a single step and without using any external thermal energy thereby making the system significantly efficient.

Figure 1:
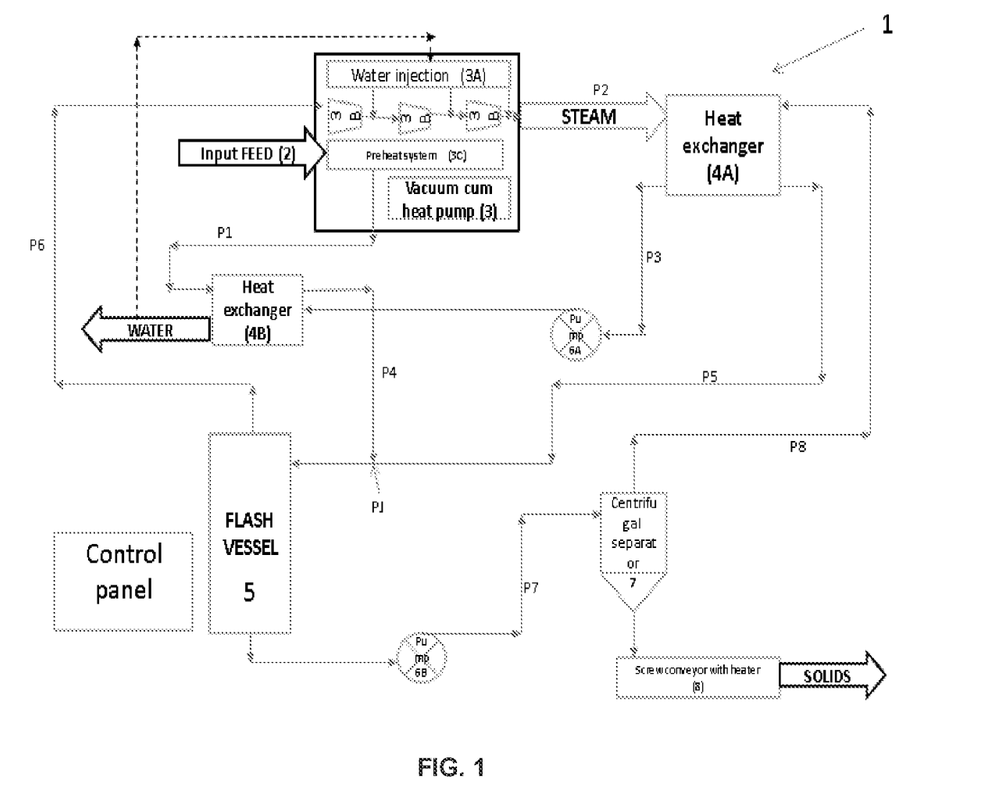
FIG. 1: Shows diagrammatic representation of present system for simultaneous recovery of purified water and dissolved solids from impure high TDS water.

Main embodiment of the present invention provides a system for simultaneous recovery of purified water and dissolved solids from impure high TDS water (1) as shown in FIG. 1; said system mainly comprises of:
Effluent input feeder (2)
Vacuum cum heat pump (3)
Passage (P)
Plurality of Heat exchanger (4)
Flash vessel (5)
Plurality of pumps (6)
Centrifugal separator (7)
Screw feeder and Induction type heating system (8)
Wherein Referring to FIG. 1 said effluent input feeder (2) provides the entry of the high TDS water effluent. Said effluent input feeder (2) is connected to vacuum cum heat pump (3). Said vacuum cum heat pump (3) comprises of:
Water injection (3A)
Compression units (3B)
Preheating system (3C)

Wherein; said compression units (3B) are placed in series to provide the steam pressure of 80-150 kPaA. The compression units (38) compress the water vapour from flash vessel (5) through passage (P6) wherein compression units (3B), also achieve the generation of vacuum in the flash vessel (5) and upgrades low pressure water vapor to steam at higher pressure, and by this means it acts as a heat pump. Said compression units (3B) are connected to water injection (3A) which control and monitor said compression units (3B) discharge temperature at each stage of compression. The compression units (3B) are further connected to preheating system (3C) to provide preheating of feed effluent (2) by increasing its temperature by 5-10° C.

Said vacuum cum heat pump (3) is further connected to plurality of heat exchanger (4). Said plurality of heat exchangers (4) are mainly selected from plate and frame or spiral type of heat exchanger. The vacuum cum heat pump (3) is connected to first heat exchanger (4A) to provide the steam through passage (P2); wherein the first heat exchanger (4A) provides the conversion of steam into liquid state of purified water. The purified water produced in first heat exchanger (4A) is connected to the second heat exchanger (4B) through the passage (P3) with P3 pump (6A) before getting discharged as product water stream from the system. Steam condensed in first heat exchanger (4A) preheats the recirculating solution coming through passage (P8) and is further connected to flash vessel (5) through passage (P5). The feed effluent stream coming from vacuum cum heat pump (3) is connected to second heat exchanger (4B) through passage (P1). The second heat exchanger (4B) further preheats the feed effluent by extracting heat from product water stream coming from first heat exchanger (4A) and is connected to through passage (P4) with junction (PJ) where it is connected to flash vessel (5) through passage (P5); wherein passages (P4 and P5) merge at junction (PJ) to provide pre-mixed effluent to flash vessel (5). The flash vessel (5) creates three separate phases i.e. water vapor at the top layer as a first phase, liquid water saturated with dissolved solid content (second phase), mixed with solids (third phase), as bottom layer. The flash vessel (5) is further connected with vacuum cum pump heat (3) through passage (P6); wherein water vapor generated in the flash vessel (5) is further recycled at said vacuum cum heat pump (3). The flash vessel (5) is connected to centrifugal separator (7) through passage (P7); through a P7 pump (6B); to provide the separation of liquid water saturated with solids and a solid phase from the mixed phase obtained in flash vessel (5). The centrifugal separator (7) is connected to screw feeder and induction type heating system (8); to provide the evaporation of the moisture present in solids and solid get removed from the system simultaneously. The centrifugal separator (7) is further connected to first heat exchanger (4A) through passage (P8) to provide the recycle stream of liquid of effluent which is preheated in first heat exchanger (4A) and further connected to flash vessel (5) through passage (P5) and the cycle repeats. Thus the simultaneous recovery of the purified water and solids is achieved.

Another embodiment of the present invention provides an automated system for simultaneous recovery of purified water and dissolved solids from impure high TDS water as shown in FIG. 1;

The control means provides control on operating parameters of different components such as pressure difference, temperature difference and TDS content of the purified water. Further control means is connected with SCADA (Supervisory Control and Data Acquisition) which provides the measuring and comparing of the set values for the parameters. Said SCADA is connected with PLC (Programmable Logic Controller) and provides the control of the parameters.

Further control means are connected to the computer where the parameters continuously get fed. Said computer is connected to HMI (Human Machine Interface) panels which act as an interphase for operator guidance during the startup and shut down operations. Further computer is connected through a suitable internet connection which provides capability for remotely monitoring the operations.

Working of the Present Invention:

Referring to FIG. 1 with respect to present invention; the working steps are as under:
1. The high TDS effluent enters into the system (1) through effluent input feeder (2) and effluent passes to the vacuum cum heat pump (3) wherein it further enters in the preheating system (3C) where it gets preheated at temperature of about 45-50° C.
2. The steam generated from said vacuum heat pump (3) passes to first heat exchanger (4A) through the passage (P2) where the steam generated by heat pump is converted to liquid water (purified water) and the recirculating effluent, entering through passage (P8), gets preheated and recirculates back to flash vessel (5) through passage (P5).
3. The second heat exchanger (4B) receives purified water from first heat exchanger (4A) through passage (P3) using pressure from P3 pump (6A) at about 250-300 kPaA pressure; wherein the heat of said purified water, enables heating of input feed (coming from preheating system (3C) via passage (P1)) effluent to about 80-95° C. within second heat exchanger (4B).
4. Effluent from second heat exchanger (4B) and recycled stream from first heat exchanger (4A) through passages (P4 and P5) respectively reaches flash vessel (5); wherein, passages (P4 and P5) merges at junction (PJ) to allow the Effluent and recycled water to mix; forming pre-mixed effluent. A small portion of the pure water from second heat exchanger (4B) is directed to water injection (3A) to be used for cooling the water vapour that passes through series of compression units (3B).
5. The flash vessel (5) operates under vacuum in the range of 1-80 kPaA pressure. Meanwhile, the water evaporation is ensued in the flash vessel (5) wherein the premixed effluent gets divided into three separate phases i.e. with water vapor (first phase) at the top layer, liquid water (second phase) saturated with dissolved solid content mixed with suspended solids (third phase) as bottom layer. Unlike the prior arts, wherein the evaporation takes place within the heat exchangers; present invention involves this evaporation and separation stage in the flash vessel (5) which obviates problem related to choking of heat exchanger tubes and thus provides ease and reliability in continuous operation of the system.
6. Wherein the water vapor generated in the flash vessel (5) is recycled to vacuum cum heat pump (3) by entering in the compression units (3B) through passage (P6) and the bottom layer of liquid water saturated with dissolved solid content and having suspended solids passes to the centrifugal separator (7) by using pressure from P7 pump (6B). The P7 pump (6B) pressurizes the mixture of liquid effluent and solid content to about 300-400 kPaA pressure. After centrifugal separation, the solids are removed from the system using screw conveyer with heater (8) and the separated liquid is recycled to first heat exchanger (4A) through passage (P8) to get heated with the heat of steam.
7. Water vapour within the compression units (3B) achieve pressure of 80-150 kPaA after compression wherein water from second heat exchanger (4B) is used to control the temperature within said compression units (3B). Moreover, the pressure difference is controlled to confirm the temperature difference between flash vessel effluent and steam condensing in the first heat exchanger (4A) is in the range of 20-60° C.
8. The interstage temperature is constantly monitored and controlled through the water injection system (3A) during the process of compression of water vapour through compression units (3B). Thus, the compression units (3B) achieves dual objectives of the generation of vacuum in the flash vessel and upgrades low pressure water vapor to steam at higher pressure, and by this means it acts as a heat pump. Therefore; the system doesn't need any additional apparatus for heating the effluent and reduce the energy and cost of the system.
9. Through the above steps, the purified water from the present system comes out from the second heat exchanger (4B) at about 40-50° C. temperature; which is low TDS water (it contains, generally, less than 50 ppm but not more than 500 ppm).

Working of Alternative Embodiment

The alternative embodiment of the present invention; which involves automatic monitor and control of the present system using control means wherein the operating parameters of different components like pressure difference, temperature difference, levels, flow of effluent and TDS content of the purified water are continuously measured and monitored.

The control means uses SCADA (Supervisory Control and Data Acquisition) for measuring and comparing the set values for the parameters and controlling them using PLC.

Various electrical drives of the motors are controlled through VFDs (variable frequency drives), and all the operating parameters of the system are controlled through the control of these VFDs by PLC.

The operating parameters are continuously fed to a computer through PLC controller and such computer is connected to a HMI (Human Machine Interface) panel which acts as an interphase for operator guidance during the startup and shut down operations. The computer is connected through a suitable internet connection to remotely monitor the operations.

Following table summarizes the test data on a pilot system of the present invention:

| Parameter | Units | Trial-1 | Trial-2 | Trial-3 | Trial-4 |
|---|---|---|---|---|---|
| Feed rate | Liter/hr. | 50 | 50 | 50 | 50 |
| Feed TDS | PPM | 25000 | 25000 | 50000 | 50000 |
| Flash pressure | kPaA | 15 | 30 | 15 | 30 |
| Pure water flow | Liter/hr. | 48 | 47.8 | 47 | 46.9 |
| Pure water TDS | PPM | 70 | 50 | 60 | 65 |
| Solids recovered (prior to final moisture removal) | Kg/hr. | 1.5 | 1.5 | 2.9 | 3.0 |
| Power consumption of system | Kwh/liter of feed | 76 | 67 | 74 | 68 |

Comparison of Prior Art and Present Invention

A typical prior art and the present invention are hereby compared in the below table to clearly bring out the technical differences between the prior art and the present invention.

A comparison is done between the prior art and our invention in two parts viz. (1) Heat pumps for steam generation and (2) ZLD systems. Following tables clearly depict the major technical differences between prior art and our invention A) Heat Pump:

| Sr. No. | Parameter | Prior art (STEAM GLOW) | Present invention |
|---|---|---|---|
| 1 | Heat pump fluid used | R245fa & R134a | Water |
| 2 | Operating pressure | Very high pressure is used | Sub-atmospheric to near atmospheric is used |
| 3 | Type of compressor used | Twin screw | Twin or tri-lobe type vapour compression system used for vacuum systems |
| 4 | Steam generation pressure( kPaA) | 200-700 kPaA | 80-150 kPaA |
| 5 | COP of heat pump (indicator of energy efficiency) | 2.5-3.2 | >7 and upto10 |

B) Zero Discharge Process:

| Sr. No. | Parameters | Prior Art | Present invention (simultaneous recovery) |
|---|---|---|---|
| 1 | Number of separate processes required | Multiple stage | Single stage (simultaneous recovery of water and solids) |
| 2 | Recovery of water and solids | Water recovered in multiple stages of process and solids recovered in last process. | Simultaneous recovery of all the water and solids in the single stage process |
| 3 | Type of heat exchanger used for supply of heat for water evaporation | Shell and tube type for MVR and MEE system. Agitated shell with thin film of liquid on shell for ATFD. Heat supplied used for latent heat of evaporation. | Plate and frame type or spiral heat exchanger. Heat supplied used for sensible heating of water and no evaporation happens in exchanger. |
| 4 | Location of water evaporation | Heat exchangers | Flash vessel |
| 5 | Operating pressure for heat exchangers | For MVR and MEE it is in vacuum to almost atmospheric pressure and ATFD is almost atmospheric. | the operating pressure for water side in the heat exchanger is 150-250 kPaA |
| 6 | Temperature differential between boiling liquid and condensing steam | MVR and MEE type systems have very low in the range of 5-12° C. and in Vacudest system it is maximum 35° C. | It is in the range of 40-60° C. |
| 7 | Utilities required for operating the systems | Boiler and cooling tower apart from electric supply | Only electric supply is required, no other utility support system is required to operate the system |
| 8 | Water recovery as % feed | <90% | >95% |
| 9 | Environment impact by way of GHG emission | GHG emission cannot be avoided | If renewable power is used than there would be no GHG emission. Even for non-renewable power sources, emission reduction can be in range of 50-60%. |

3) GHG Emission:

Present invention offers very high energy efficiency compared to prior arts and accordingly it results in substantial reduction in GHG emissions.

Energy efficiency can be explain from following table with the example of processing effluent with 5% TDS for recovery of pure water and solids:

| Sr. No. | Parameters | Prior art | Our invention |
|---|---|---|---|
| 1 | Steam consumption, kg/KL | 309 | 0 |
| 2 | Power consumption, kwh/KL | 39 | 70 |
| 3 | Water recovery, % of feed | 88 | 95 |

The table provides the comparison between prior art and present invention for power consumption, steam consumption and % water recovery; wherein said comparison assumes conservative figure for power consumption in our invention and in many cases it can be much lower also. However, this figure is used to highlight energy savings even in conservative case.

In order to understand the macro economic impact, in terms of ultimate fossil fuel consumption and hence GHG emissions, following possible scenarios for energy supply in economy are considered for comparison of present invention with prior art. These scenarios are as follows:

| Sr. No. | Parameters | Case-1 | Case-2 | Case-3 | Case-4 |
|---|---|---|---|---|---|
| 1 | Fossil fuel used for boiler | Coal | Coal | Gas | Gas |
| 2 | Boiler efficiency, % | 80 | 80 | 85 | 85 |
| 3 | Power | | | | |

-continued

| Sr. No. | Parameters | Case-1 | Case-2 | Case-3 | Case-4 |
|---|---|---|---|---|---|
| | generation parameters: | | | | |
| | Fuel used | Coal | Coal | Gas | None |
| | Technology | Conventional | Super-critical | Combined cycle | Renewable |
| | Heat rate (NCV basis), kcals/kwh | 2500 | 2100 | 1700 | 0 |

Figure 2:
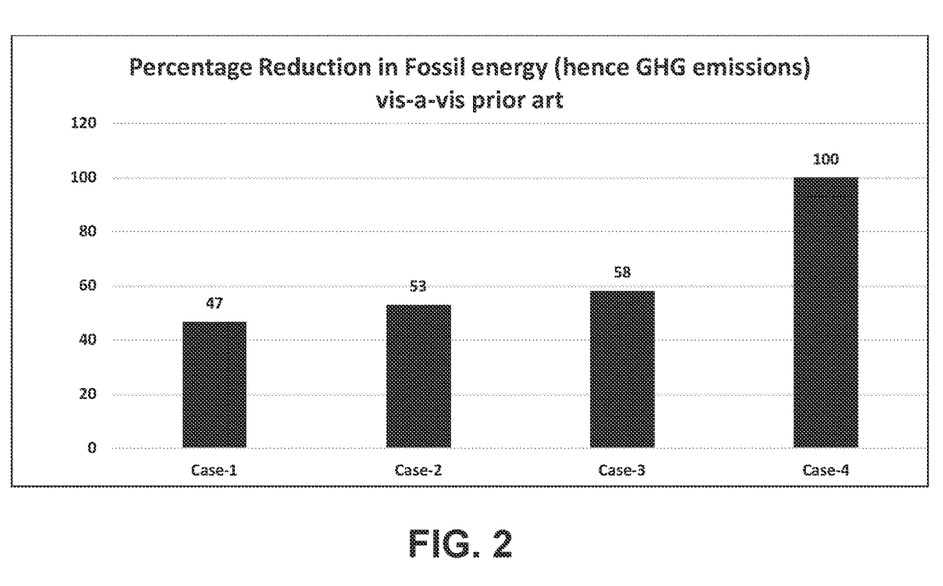
FIG. 2: Is a table showing a reduction in fossil energy consumption, and hence GHG emissions, in the range of 50-100% as compared to the prior art.

Based on these four scenarios for energy supply in economy, the reduced fossil energy consumption and hence reduced environmental impact (in terms of GHG emissions) in present invention vis-à-vis prior arts is summarized in FIG. 2.

FIG. 2 presents only four scenarios as typical examples, it can be done for any other permutation and combination of energy mix and the savings would work out to be of similar magnitude. As can be seen from the above, the present invention helps in reducing fossil energy consumption and hence GHG emissions in the range of 50-100% compared to prior arts.

Advantages of the Invention

1. Present invention has water evaporation process without any external thermal energy input which makes it significantly more efficient and reduces GHG emissions significantly.
2. Present invention has simultaneous recovery of the purified water and solids from high TDS input water thus provide simple processes and reduce the energy intensity of the system.
3. Present invention doesn't require support utilities like boiler and cooling tower which reduces the overall capital cost and, also, cost of continuous requirement of external thermal energy thereby making system efficient.
4. Heat supplied is used for sensible heating of water and evaporation of water takes place in flash vessel thereby obviating problem of choking of heat exchanger tubes
5. By preventing the problem of chocking of heat exchanger tubes it provides ease and reliability in continuous operation of the system.
6. The system requires very low electrical energy and no thermal energy to operate thereby making the system self-sufficient.
7. Present invention can be made completely automated operating system with possibilities for remotely controlled operations.
8. Present invention operates under vacuum and heat pump which needs compression to pressure which is slightly higher than atmospheric pressure thereby making invention efficient and cost effective and yet it helps in achieving high temperature differential between boiling liquid and condensing steam.
9. The invention results in compact preassembled and may be containerized system to operate as "plug and play" system which results in less requirement of land and civil works costs.
10. The invention is simple, user friendly and yet efficient.
11. The invention provides a significantly efficient and cost effective system that can be installed at large as well as small and medium sized industries and providing versatility for large scale applications to help in achieving sustainable development of economies.
12. Present invention need small land area for the process and thus reduces civil works costs.

Applicability of Present Invention

Purified water and dissolved solids are recovered from any impure water stream with high TDS content; including, but not limited to, from industrial effluent waters; by a process developed wherein the impure water is evaporated under vacuum and water vapour generated are upgraded as steam, using a unique integration of vacuum system as heat pump, to be self-sufficient in thermal energy requirements for evaporation process.

The invention provides wide scale application for water recovery, recycles, reuse and reduced GHG emissions; which will help in Sustainable Economic Development.

There are various applications of the present system; which includes, but not limited its application for ZLD operations but can also be useful in following other similar applications:
Desalination of sea water
Purification of any other impure water source to produce process or even DM water for application in process industries
Production of purified water for pharmaceutical industries
Recovery of dissolved solids from their solutions in water (may be as by product or even main product)
Preconcentration of solutions of dyes/chemicals prior to their spray drying so as to reduce the cost of drying
Preconcentration of milk or any other fruit/vegetable juice before their spray drying to produce dry powder product

The invention claimed is:

1. A system for simultaneous recovery of purified water and dissolved solids from impure high TDS (total dissolved solids) water, comprising:
an impure high TDS water input feeder;
a vacuum cum heat pump;
a plurality of passages, comprising first through eighth passages;
a plurality of heat exchangers;
a flash vessel;
a plurality of pumps;
a centrifugal separator;
a screw feeder and induction type heating system;
wherein:
the impure high TDS water input feeder provides an entry of the impure high TDS water into the vacuum cum heat pump;
the vacuum cum heat pump enables compression and pre heating of the impure high TDS water using:
a water injection system,
compression units, and
a reheating system,
the water injection system is provided to control and monitor temperature of discharge from each of the compression units which compresses water vapor received from the flash vessel through the sixth passage and generates a vacuum in the flash vessel upgrading low pressure water vapor to steam at a higher pressure, thereby acting as a heat pump; wherein the compression units:
are connected to the preheating system which provides pre heating of the impure high TDS water by increasing a temperature of the impure high TDS water by 5-10° C.; wherein the vacuum cum heat pump is connected to the plurality of heat exchangers, the plurality of heat exchangers are provided to exchange heat from steam generated in the system and condensing the steam to liquid;

wherein the plurality of heat exchangers comprises a first heat exchanger and a second heat exchanger;

wherein:

the first heat exchanger receives steam from the vacuum cum heat pump through the second passage;

the first heat exchanger provides the conversion of steam into the purified water and the steam condensed in the first heat exchanger is used to preheat a recirculating solution coming through the eighth passage and the first heat exchanger is further connected to the flash vessel through the fifth passage;

the second heat exchanger receives the purified water produced from steam from the first heat exchanger through the third passage using pressure of about 250-300 kPaA from a P3 pump (6A); wherein the second heat exchanger is used to cool the purified water, wherein the second heat exchanger discharges the purified water, from the system;

the second heat exchanger receives feed impure high TDS water through the first passage from the vacuum cum heat pump which is connected to the second heat exchanger through the first passage; wherein the second heat exchanger provides preheating of feed impure high TDS water by extracting heat from the purified water coming from the first heat exchanger; wherein the second heat exchanger is connected to the flash vessel through the fourth passage;

the flash vessel is provided to receive premixed recirculation stream with feed impure high TDS water from a junction formed at an intersection of the fourth and fifth passages wherein three separate phases of the premixed recirculation stream with feed impure high TDS water are formed, water vapor at a top as first phase, liquid water saturated with dissolved solid content as a second phase and solids as a third phase; wherein the water vapor generated as the first phase is passed through the sixth passage to be recycled through the vacuum cum heat pump in a present closed loop system for simultaneous recovery; the flash vessel is further connected to the centrifugal separator through the seventh passage by using pressure from a P7 pump (6B); and the centrifugal separator is provided to receive the second and third phases from the flash vessel using pressure of about 250-300 kPaA from the P7 pump (6B); the centrifugal separator separates a liquid phase and a solid phase; the centrifugal separator is connected to the screw feeder and induction type heating system for evaporating moisture present in solids and removing the solids from the system simultaneously.

2. The system as claimed in claim 1, wherein the plurality of passages are provided to channelize steam and liquid generated in the system for further processing; wherein:

the first passage is provided to channelize feed impure high TDS water from the vacuum cum heat pump to the second heat exchanger, the second passage is provided to channelize steam from the vacuum cum heat pump to the first heat exchanger, the third passage is provided to channelize the purified water from the first heat exchanger to the second heat exchanger, the fourth passage is provided to channelize feed impure high TDS water from the second heat exchanger to the flash vessel, the fifth passage is provided to channelize recirculation liquid stream from the first heat exchanger to the flash vessel, the sixth passage is provided to channelize water vapor generated by flash of the recirculation stream as well as the feed impure high TDS water from the flash vessel to the vacuum cum heat pump, the seventh passage is provided to channelize liquid and solid content of the feed impure high TDS water from the flash vessel to the centrifugal separator, the seventh passage is provided to channelize solid from the centrifugal separator to screw feeder and induction type heating system, and the eighth passage is provided to channelize recirculation stream from the centrifugal separator to the first heat exchanger.

3. The system as claimed claim 2, wherein the plurality of pumps are provided to pressurize the recirculation stream, which is a mixture of a saturated solution of dissolved salts in water and solid, being treated in the system; wherein the P3 pump (6A) is placed on the third passage and pumps pressurized condensate received from the first heat exchanger to the second heat exchanger through the third passage and the P7 pump (6B) is placed on the seventh passage which pumps pressurized recirculation stream from the flash vessel to the centrifugal separator through the seventh passage.

4. The system as claimed in claim 3, wherein the plurality of heat exchangers are selected from a plate and frame type heat exchanger, or a spiral type heat exchanger.

* * * * *